Dec. 29, 1931.  H. FELDMEIER ET AL  1,839,092
DISCHARGE MECHANISM FOR PASTEURIZER VATS AND THE LIKE
Filed Jan. 30, 1928  2 Sheets-Sheet 2
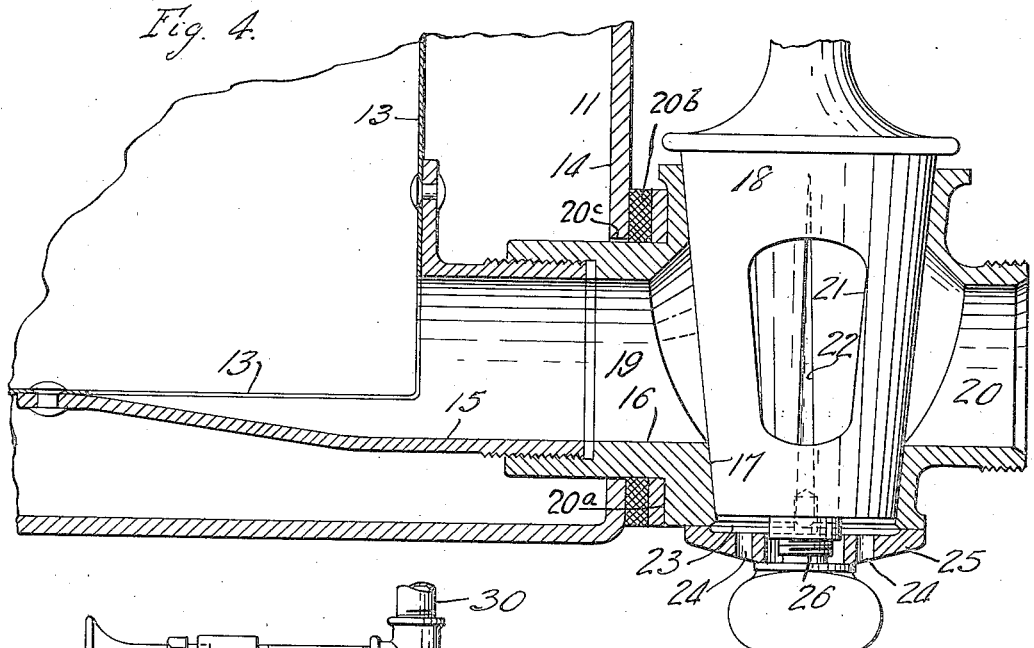
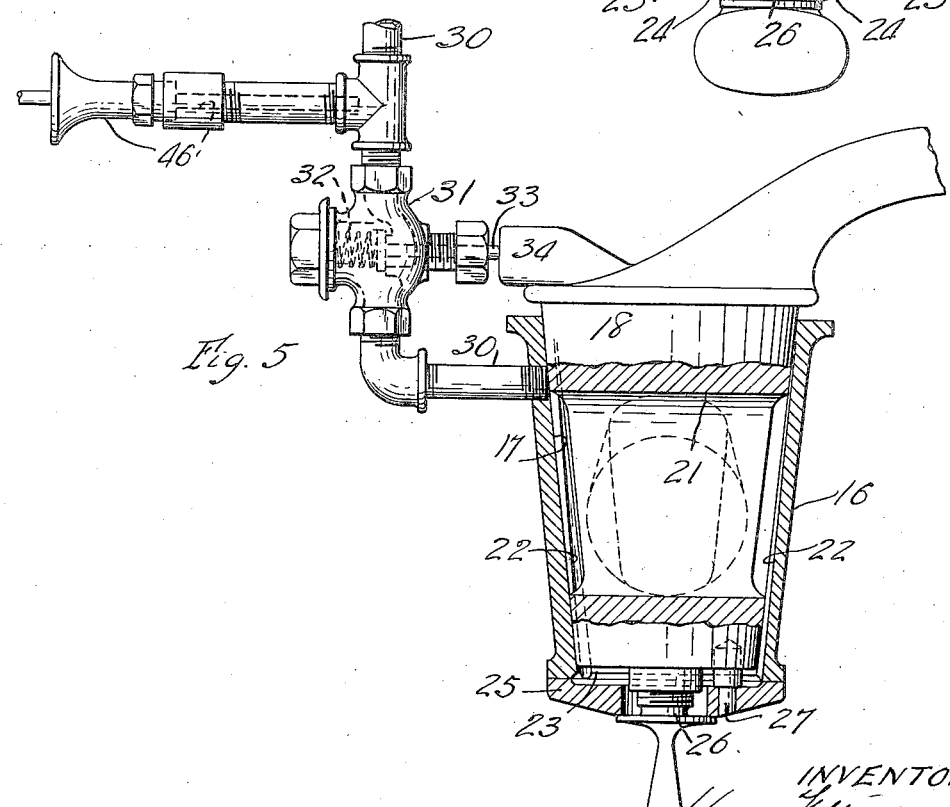
INVENTORS
Harvey Feldmeier
and Charles D. Dalzell
by Parker & Prothnow
ATTORNEYS

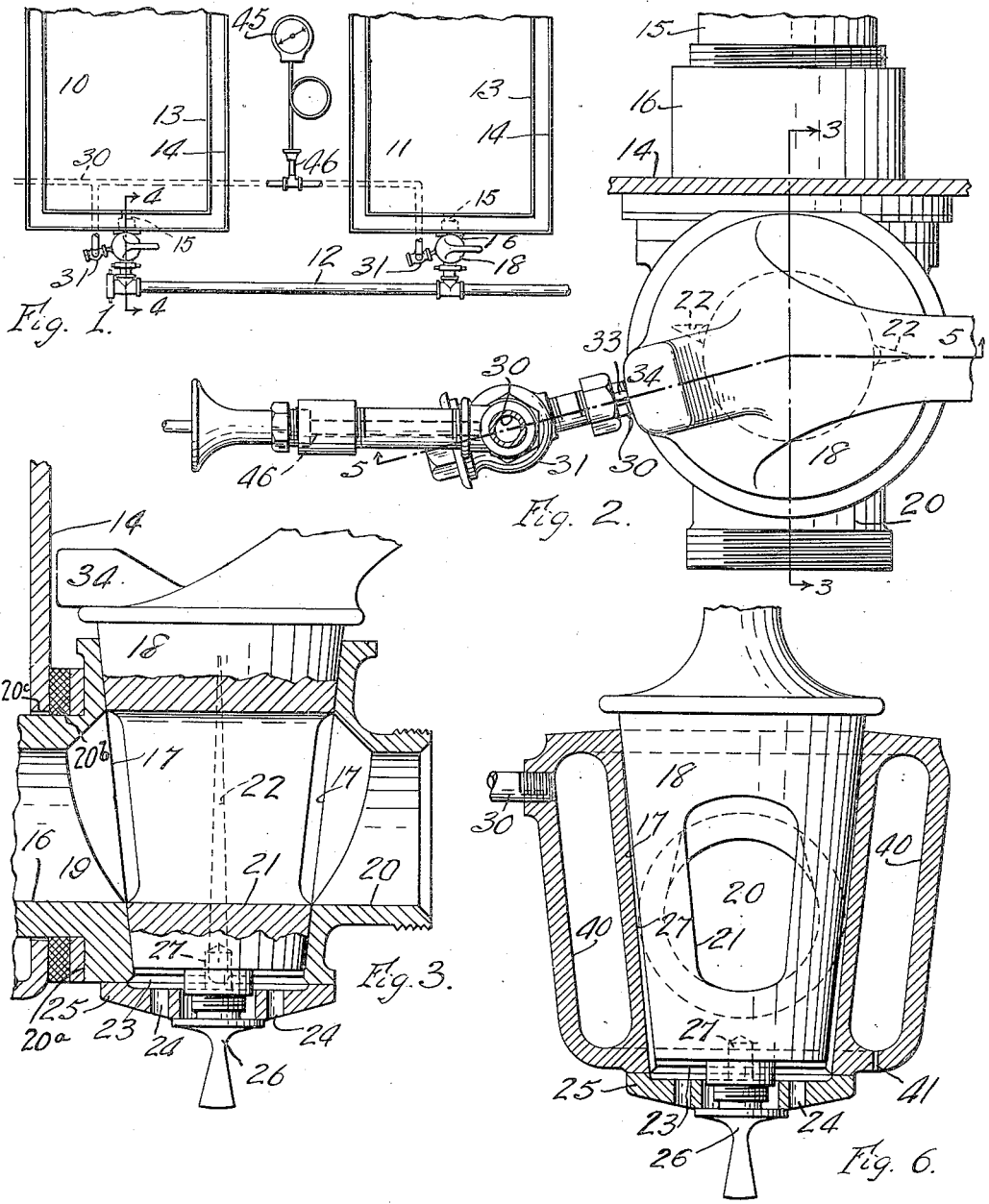

Patented Dec. 29, 1931

1,839,092

UNITED STATES PATENT OFFICE

HARVEY FELDMEIER AND CHARLES B. DALZELL, OF LITTLE FALLS, NEW YORK, ASSIGNORS, BY MESNE ASSIGNMENTS, TO CHERRY-BURRELL CORPORATION, OF WILMINGTON, DELAWARE, A CORPORATION OF DELAWARE

DISCHARGE MECHANISM FOR PASTEURIZER VATS AND THE LIKE

Application filed January 30, 1928. Serial No. 250,686.

This invention relates to discharge valves or mechanisms for pasteurizer vats and the like.

In milk pasteurizers of the kind, for example, which comprise an inner tank or vat lining which holds the milk and an outer heating or insulating jacket, the milk outlet or discharge connection extends from the inner tank out through the jacket. This forms a discharge passage of substantial length bridging the space between the walls of the inner vat and the jacket, and usually extending beyond the outer jacket wall, and unless an outlet valve of the so-called "flush type" located substantially flush with the wall of the inner vat is employed, a pocket is formed in which milk will lie, and this pocketed milk may not be heated up to the pasteurizing temperature and held at that temperature long enough to insure proper pasteurization of this milk. It is, of course, imperative that all of the milk coming from the pasteurizer should be properly pasteurized, since the mixture of any unpasteurized milk with the pasteurized milk will contaminate the latter and nullify the benefit of its pasteurization, and in some localities the health authorities have required the employment of flush outlet valves so as to avoid milk pockets at the outlets which might result in unpasteurized milk. Furthermore, there are many establishments in which two or more pasteurizers are arranged in parallel and connected to a common discharge line leading to the milk cooler or receiver for the pasteurized milk, each pasteurizer vat being provided with a discharge valve or mechanism for separately controlling the discharge of milk from the several vats. If any discharge valve in such an installation should leak, the raw or unpasteurized milk leaking past the valve might escape into the discharge line and constitute a source of contamination for the properly pasteurized milk from another vat.

In order to insure against the collection of any unpasteurized milk at the vat outlets and prevent contamination of the pasteurized milk by unpasteurized milk from the discharge connections of the pasteurizer vats, discharge valve mechanisms have been proposed in which a flush valve is located at the inner end of the discharge passage substantially flush with the inner wall of the pasteurizer vat, and a second valve is located outwardly beyond the vat jacket, together with a leak valve or device for permitting any milk which might escape past the inner valve to discharge from the chamber between the two outlet valves so as to prevent the unpasteurized milk from passing the outer valve into the discharge line. It has also been proposed to provide steam sterilizing means whereby steam is admitted to this chamber between the inner and outer discharge valves for sterilizing the same before the discharge valves are opened to discharge the pasteurized milk from the vat. Such double discharge valve mechanisms, however, besides being complicated and expensive, have not proven entirely satisfactory, and do not avoid all practical objections.

One object of our invention is to provide means of simple and practical construction which will insure the proper heating and pasteurization of the liquid in the discharge passage between the inner vat or vat lining and the discharge valve, which may be located outwardly beyond the vat jacket.

Other objects of the invention are to provide a discharge valve or mechanism for liquid pasteurizer vats and the like which is of simple and practical construction, is reliable in operation and will prevent the leakage of liquid past the valve either from the vat to the discharge line or from the discharge line to the vat; also to provide simple and practical mechanism which will operate automatically when the discharge valve is closed to turn on a heating medium for pasteurizing the liquid in the discharge passage or connection inwardly beyond the valve; also to provide a practical mechanism by which, when the discharge valve is closed, steam will be automatically admitted to the valve for sterilizing the same and the discharge connection or passage; also to provide a valved steam connection to the discharge valve and means whereby when the discharge valve is closed, the steam valve will be opened to admit steam to the discharge valve and when the discharge valve is opened, the steam valve will be closed; also to provide simple indicating or recording means which will show that the steam was turned on the discharge valve during the pasteurizing period or whenever the discharge valve was closed; also to provide in pasteurizing apparatus comprising a plurality of pasteurizing vats and a common discharge line for the same, simple mechanism for separately controlling the discharge of milk from the several vats and preventing contamination of pasteurized milk from one vat by raw milk leaking from the discharge connection of another vat; and also to improve discharge valves or mechanisms for pasteurizer vats and the like in the other respects hereinafter described and set forth in the claims.

The accompanying drawings illustrate discharge mechanisms for liquid pasteurizes of somewhat different constructions embodying our invention, but it will be understood that the invention is not restricted to the particular constructions illustrated in the drawings, as exemplifying practical embodiments of the invention.

In said drawings:

Fig. 1 is a diagrammatic view on a reduced scale, partly in plan and partly in elevation, showing two pasteurizer vats and the discharge mechanisms therefor.

Fig. 2 is an enlarged plan view of the discharge and sterilizing mechanism for one of the vats showing a slightly different position of the steam recorder bulb.

Fig. 3 is a sectional elevation thereof on line 3—3, Fig. 2, but showing the open position of the valve plug.

Fig. 4 is a sectional elevation thereof on line 4—4, Fig. 1, on an enlarged scale.

Fig. 5 is a sectional elevation thereof on line 5—5, Fig. 2, showing the closed position of the vat discharge valve and the open position of the steam supply valve.

Fig. 6 is a sectional elevation of a discharge valve of modified construction.

10 and 11 represent two pasteurizer vats which may be of any usual or suitable construction, and 12 represents a discharge line for conveying the liquid away from the vats or to the cooler for the pasteurized liquid. Each of the pasteurizers shown comprises an inner vat or receptacle 13 which holds the liquid to be pasteurized and an outer jacket or casing 14 which surrounds the inner vat, from which it is separated by a space to which a heating medium may be supplied for heating the milk in the inner vat, or which may confine a heat insulating medium.

In the first construction shown, the inner vat is provided with a discharge nipple or fitting 15 which projects outwardly therefrom and to which is coupled, by screw-threaded or other suitable connection, the casing of the liquid discharge or outlet valve 16. This valve is preferably of the turn plug type comprising a casing having a frusto-conical chamber 17 in which the frusto-conical turn plug 18 is seated and adapted to turn, and an inlet passage 19 and an outlet passage 20 which extend from said plug chamber, for connection respectively with the discharge or outlet nipple 15 of the vat and with the discharge line 12. The valve plug is provided with the usual transverse passage 21, which in the open position of the valve, establishes communication between inlet and outlet passages 19 and 20 in the valve casing, and in the closed position of the valve plug shuts off such communication and prevents the discharge of the liquid from the vat. The valve is constructed so as to provide an escape or leak passage for the liquid when the valve is closed, so that in the event of the valve leaking when the plug is in the closed position, the liquid leaking from the inlet passage 19 into the plug chamber can escape freely from the valve casing and will not pass into the outlet passage 20 of the valve and to the discharge line with which the outlet passage of the valve casing connects. For this purpose, grooves or channels 22 are preferably formed interiorly in the plug chamber 17 of the valve casing, extending from the upper portion of the plug chamber 17 to the bottom of the same and being of downwardly increasing width. The grooves are located in the sides of the plug chamber between the inlet and outlet passages 19 and 20 of the casing and so that when the valve plug is in the closed position, its transverse passage 21 will communicate with said leak grooves. The lower ends of the leak grooves 22 communicate with the space 23 in the bottom of the plug chamber of the casing below the lower end of the plug, which space 23 in turn is open to the exterior of the valve casing, as for instance, by means of one or more holes 24 in the plate or washer 25 which forms the closure for the lower end of the plug chamber. A passage or opening is thus provided from that portion of the plug chamber 17 with which the transverse passage of the plug communicates in the closed position of the plug to the outside of the valve casing at the bottom thereof, so that when the valve is in closed position, any liquid which might leak from the inlet passage 19 of the valve casing into the plug chamber will freely escape therefrom through the grooves 22 and the holes 24 in the bottom plate, and cannot pass the valve plug into the outlet passage 20 of the valve casing. The bottom closure plate 25 is forced against the bottom of the valve casing by the usual adjusting screw 26 passing through the plate into a threaded hole in the turn plug and the plate is locked to the turn plug so as to turn therewith and prevent the loosening of the screw 26, as by a stud 27 projecting from the plate into a seat in the plug.

30 represents a supply pipe or connection adapted to deliver steam or other heating or sterilizing medium to the liquid discharge valve. In the construction shown in Figs. 1-5, this steam pipe has a branch or portion secured in a hole in the side of each discharge valve casing at one side of the upper end of one of the leak grooves 22 and in position to communicate with the plug passage 21 when the plug is in closed position, so that when the valve is closed, steam can be admitted from this supply pipe into the plug chamber and passage 21 of the plug and can flow through the plug passage 21 and through the grooves 22 into the lower end of the plug chamber and escape through the outlet holes in the bottom plate 25, thus heating the valve, and sterilizing the interior of the valve, including the plug, plug chamber and leak passage. The discharge of steam from the steam pipe 30 to the discharge valve may be controlled by a suitable steam valve or device 31 arranged at a suitable point in the steam line or connection, preferably adjacent to the upper end of the discharge valve casing. This valve may be a self-closing valve of any suitable construction, such as an ordinary whistle valve which is provided with a movable disk or member adapted to be closed or moved to and held against the valve seat in the casing of the valve 31 by a suitable spring 32. The valve disk or member is provided with a stem 33 which projects out of the valve casing through a suitable stuffing box in position to be moved to unseat or open the valve disk by means which move with or are actuated by the turn plug of the vat discharge valve 16. As shown, the turn plug of the discharge valve is provided at the upper end with a cam portion 34 which is arranged so that when the plug is turned to closed position, the cam will engage and force the stem of the steam valve inwardly to open the steam valve and permit the discharge of steam from the pipe 30 into the vat discharge valve. When the plug of the discharge valve 16 is turned to open position to discharge liquid from the vat, the cam moves out of engagement with the valve stem and permits the steam valve to be closed by its spring to stop the discharge of the steam. Thus, whenever the vat discharge valve is closed, the steam valve will be automatically opened and held open and permit the flow of steam through the liquid discharge valve, and when the vat discharge valve is opened to discharge the liquid from the vat, the steam valve will be automatically closed and prevent the discharge of steam. The steam thus delivered to the vat discharge valve 16 heats the same and the liquid which fills the discharge passage between the valve plug and the wall of the inner vat 13, and since the steam valve is held open while the liquid discharge remains closed, that is during the heating and holding period for the liquid in the vat, the liquid in the discharge passage will also be heated to and retained at the required temperature sufficiently long to properly pasteurize the same. Therefore, there can be no danger of contamination of the pasteurized milk by mixture therewith of raw or unpasteurized milk from the discharge passage or connection, and the necessity for a complicated valve mechanism including an inner flush valve is obviated.

As clearly shown in Figs. 2, 3 and 4, the valve casing 16 is provided, around the portion thereof forming the inlet passage 19, and close to the turn plug 18, with a shoulder 20a facing the vat jacket 14, and a suitable packing 20b is confined between this shoulder 20a and the outer face of the jacket 14. This packing is compressed by screwing or connecting the valve casing 16 tightly to the outlet fitting 15 of the inner receptacle and closes or seals the opening 20c in the vat jacket through which the liquid discharge passage formed by the discharge fitting 15 and the valve casing extends, and thereby prevents leakage from the jacket, of any heating medium which may be employed therein. By thus constructing the valve casing and sealing the opening 20c, the valve can be arranged with its turn plug close to the vat jacket, simply leaving sufficient space for the packing between the shoulder and the jacket. Therefore, the length of the discharge passage or connection between the inner receptacle and the valve plug is reduced to the minimum and consequently reduces the amount of milk which can lie in the passage between the valve plug and the inner receptacle. As a result, there is less danger of this body of milk not being heated to the pasteurizing temperature.

In the construction shown in Figs. 1-5, the steam delivered to the liquid discharge valve, in addition to heating the liquid in the discharge connection, as explained, also thoroughly sterilizes the liquid discharge valve because the steam is delivered into the interior of the valve. The leak passage in the liquid discharge valve permits the escape of the steam condensation, and a circulation of steam through the discharge valve is maintained so long as the discharge valve remains closed, during which time the steam supply valve is held open.

In the modified construction shown in Fig. 6, the liquid discharge valve is provided with a jacket forming a steam chamber 40 surrounding the turn plug chamber of the valve casing, and the steam supply pipe 30 connects with this jacket, which is provided at its lower end with a small escape opening 41 for the condensation. Otherwise this construction is similar to that shown in Figs.

1-5, so that when the discharge valve is closed, the steam supply valve 31 will be held open, and steam will circulate through the steam jacket 40, thereby heating the valve and the liquid in the discharge passage to insure pasteurization of such liquid.

By the described constructions, a discharge valve of very simple form, having only a single movable member or turn plug can be employed. Nevertheless, heating and proper pasteurization of the liquid in the valve and discharge passage is insured, and in addition, if the valve should leak, the liquid will escape from the valve casing and be prevented from passing into the discharge line, thus insuring against contamination of the pasteurized liquid in the line by the leakage thereinto of raw or unpasteurized liquid. Furthermore, the described discharge valve having the turn plug is much more reliable for use with milk pasteurizers than a lift or slide valve of the sort employed in the discharge valve mechanisms in which a flush inner valve is employed at the outlet opening in the inner vat. In pasteurizing milk the interior surfaces of the valves soon become coated with casein which prevents tight closing of lift valves and causes them to leak. With the turn plug valve, this is prevented, as the rubbing action between the valve plug and its seat when the valve plug is turned, keeps the plug and seat surfaces free from the casein and insures a much tighter closure of the valve, which will prevent leakage.

Dairies and establishments in which milk is pasteurized are usually subjected to supervision or inspection by the Health authorities, and in order that the inspector may be assured that the milk in the discharge connection will always be properly pasteurized, a steam recording device 45 is provided having a thermal bulb or controlling member 46 suitably located in the steam line or connection so that the recorder will show at all times whether or not the steam has been supplied to the liquid discharge valve to heat the same and properly pasteurize the milk in the discharge passage or connection. Since by the automatic operation of the steam supply valve, as explained, the steam is delivered to the milk discharge valve during the period that the discharge valve remains closed, it can be readily determined by reading the record of the steam recorder whether or not the steam was on the line at all times when the milk discharge valve was closed and therefore operated to heat the milk in the discharge connection. In installations employing a single pasteurizing vat, the thermal or controlling bulb 46 of the recorder may be located in the steam connection adjacent to the discharge valve, as shown in Figs. 2 and 5. In installations such as shown in Fig. 1, in which a plurality of pasteurizing vats are connected to a common discharge line, the location of the thermal bulb or controlling element of the recorder can be at any convenient point in the steam line which connects with the discharge valves of the several pasteurizer vats, for instance, as indicated in Fig. 1, which shows the bulb disposed in the line between the vat discharge valves.

As above explained, a discharge valve with the steam jacket 40, as shown in Fig. 6, can be used in combination with an automatic steam controlling device such as the valve 31, which operates to supply steam to the discharge valve only when the latter is closed. It will be apparent, however, that the steam jacketed discharge valve shown in Fig. 6 can be used without the device for turning on and shutting off the steam. In such case, steam will be supplied to the discharge valve jacket 40 from the steam supply pipe 30 during the periods when the discharge valve 16 remains closed, and as well when the discharge valve is open, and the steam will operate to heat the valve and discharge connection and insure the pasteurization of the liquid lying in the discharge passage or connection between the discharge valve and the inner vat or container of the pasteurizer. Since with the jacketed valve the steam is not admitted into the plug chamber of the valve casing, it is not so important to shut off the steam when the valve is open or the valve plug is removed for cleaning, as in the case of the valve shown in Figs. 1-5. The condensation escape hole 41 in the jacket need not be large enough to permit an objectionable waste of steam.

We claim as our invention:

1. The combination with a liquid pasteurizing vat, of a discharge valve for the same comprising a valve casing having a discharge passage communicating with the vat, and a valve member movable in said casing to and from a closed position in which the valve prevents the discharge of liquid from the vat, a connection for supplying a heating medium to said discharge valve for heating the liquid in said discharge passage between the vat and said valve member, a device which controls said supply connection and is operable independently of said valve member to supply and shut off said heating medium, and mechanism whereby said controlling device is actuated to supply the heating medium to the discharge valve by the movement of said movable valve member to its closed position.

2. The combination with a jacketed liquid pasteurizing vat, of a discharge valve for the same comprising a valve casing having a discharge passage communicating with the vat, and a valve member located exteriorly of said vat jacket movable in said casing to and from a closed position in which the valve prevents the discharge of liquid from the vat, a connection for supplying a heating medium for heating the liquid in said discharge passage between the lining of the vat and said valve member, a separate device in said supply connection and which is operable to supply and shut off the heating medium, and mechanism whereby the movement of the movable member of said discharge valve actuates said controlling device to supply the heating medium to the discharge valve when the discharge valve is closed and to shut off the heating medium when the discharge valve is opened.

3. The combination with a jacketed liquid pasteurizing vat, of a discharge connection for the same comprising a valve casing having an inlet passage communicating with the outlet opening of said vat and an outlet passage, a single movable valve member which is movable in said valve casing to shut off and open communication between said inlet and outlet passages of the valve casing, and a leak passage arranged between said inlet and outlet passages to permit the escape of leakage from said valve casing and prevent the flow of leakage past said valve member to the outlet passage of the valve casing when said movable valve member is closed and means independent of said valve but actuated by the closing movement of said valve member controlling the supply of a heating medium for heating the liquid in the said discharge connection between the lining of the vat and said movable valve member.

4. The combination with a liquid pasteurizing vat, of a discharge valve for the same comprising a valve casing having an inlet passage communicating with the outlet opening of said vat and an outlet passage, and a single movable valve member which is movable in said valve casing to shut off and open communication between said inlet and outlet passages of the valve casing, a leak passage arranged between said inlet and outlet passages and controlled by said valve member to permit the escape of leakage from said valve casing and prevent the flow of leakage past said valve member to the outlet passage of the valve casing when said movable valve member is closed, a connection for supplying a heating fluid to said discharge valve, and independent controlling mechanism for said supply connection which operates automatically to supply the heating medium to said discharge valve when said movable valve member is moved to closed position.

5. The combination with a liquid pasteurizing vat, of a discharge valve for the same comprising a valve casing having an inlet passage communicating with the outlet opening of said vat and an outlet passage, and a single movable valve member which is movable in said valve casing to shut off and open communication between said inlet and outlet passages of the valve casing, a leak passage arranged between the inlet and outlet passages and controlled by said valve member to permit the escape of leakage from said valve casing and prevent the flow of leakage past said valve member to the outlet passage of the valve casing when said movable valve member is closed, a connection for delivering a sterilizing medium into the interior of said discharge valve casing, and a separate controlling device for said connection which is actuated upon the movement of said movable member of the discharge valve to closed position for delivering the sterilizing fluid into the discharge valve casing and said leak passage.

6 The combination with a liquid pasteurizing vat, of a discharge valve for the same, comprising a valve casing communicating with the outlet opening of the vat and having inlet and outlet passages, a turn plug in said valve casing in a plug chamber between said inlet and outlet passages, and having a passage adapted in the open position of said valve to establish communication between said inlet and outlet passages of the valve casing, said discharge valve having a leak passage connecting with said plug chamber and controlled by said turn plug to permit leakage to escape through said leak passage from said plug chamber when said valve is closed, a supply connection for a sterilizing medium, and independent controlling mechanism for said supply connection operating when said discharge valve is closed to deliver the sterilizing medium into the turn plug chamber of said discharge valve.

7. The combination with a liquid pasteurizing vat, of a discharge valve for the same, comprising a valve casing communicating with the outlet opening of the vat and having inlet and outlet passages, a turn plug in said valve casing in a plug chamber between said inlet and outlet passages, and having a passage adapted in the open position of said valve to establish communication between said inlet and outlet passages of the valve casing, said discharge valve having a leak passage connecting with said plug chamber and controlled by said turn plug to permit leakage to escape through said leak passage from said plug chamber when said valve is closed, a supply connection for a sterilizing medium communicating with said leak passage of the discharge valve casing, and controlling mechanism for said supply connection including a separate valve in said connection and operating when said discharge valve is closed to deliver the sterilizing medium into said discharge valve casing and said leak passage thereof.

8. The combination with a liquid pasteurizer vat, of a discharge valve therefor, comprising a valve casing having an inlet passage communicating with the outlet opening of the vat and having an outlet passage, and a turn plug rotatable in a plug chamber in said casing between said inlet and outlet passages, said turn plug having a passage adapted to connect said inlet and outlet passages of the valve casing in the open position of the valve, and said valve casing having a leak passage extending from said chamber to the exterior of the valve casing and with which the plug passage communicates in the closed position of the valve, whereby liquid leaking from the inlet passage of the valve casing into said turn plug chamber can escape therefrom through said leak passage when the discharge valve is closed, a supply connection for a sterilizing medium communicating with said plug chamber within the valve casing, and independent controlling mechanism for said supply connection operating to deliver the sterilizing medium to said plug chamber when the discharge valve is closed.

9. The combination with a liquid pasteurizing vat, of a discharge valve therefor comprising a valve casing communicating with the outlet opening of the vat and having inlet and outlet passages, and a single movable valve member movable in said casing between said inlet and outlet passages for shutting off and opening communication between said inlet and outlet passages, said discharge valve having a leak passage extending to the exterior thereof from a point between said inlet and outlet passages and controlled by said valve member for the escape of leakage from the valve casing through said leak passage when the discharge valve is closed, and separate mechanism controlled by the movement of the movable valve member for delivering a sterilizing medium into the discharge valve when said discharge valve is closed, and shutting off said sterilizing fluid when the discharge valve is opened.

10. The combination with a liquid pasteurizing vat, of a discharge valve connecting by a discharge passage with said vat and having a single valve member movable to open and close said valve, said valve having a leak drip passage controlled by said valve member, a steam supply line to said valve, mechanism which controls said steam supply line and operates automatically to deliver steam into said valve for sterilizing the same when the valve is closed, and a recording device having a controlling element disposed in said steam line.

11. The combination with a plurality of liquid pasteurizing vats, and a common discharge line for said vats, each of said vats having an inner container for the liquid and an outer jacket, of a liquid discharge connection for each vat extending from the inner container out through said outer jacket to said discharge line, and a discharge valve for each vat having a single movable member controlling the discharge of liquid through said discharge connection and located exteriorly of said vat jacket, said valve having a leak passage controlled by said movable valve member which permits the escape of leakage from the valve casing and prevents the flow of leakage past said valve into said discharge line when the valve is closed, and supply means for a heating medium which connects with said discharge valves, and supplies the heating medium to said valves when said discharge valves are closed for heating said valves and the liquid in the discharge connections between the discharge valves and said inner containers of the pasteurizing vats.

12. The combination with a liquid pasteurizing vat comprising an inner receptacle provided with a discharge fitting and a jacket outside of said inner receptacle, of a discharge valve comprising a casing having an inner portion rigidly attached to and supported by said discharge fitting and forming therewith a discharge passage extending from said inner receptacle through an opening in said outer jacket, and a turn plug arranged crosswise of said discharge passage outwardly beyond but close to said jacket, said valve casing having exteriorly thereof a shoulder surrounding said discharge passage closely adjacent said turn plug, and a packing surrounding said inner portion of the valve casing and clamped between said shoulder and said jacket for closing said opening in the jacket through which said discharge passage extends.

13. The combination with a liquid pasteurizing vat comprising an inner receptacle provided with a discharge fitting and a jacket outside of said inner receptacle, of a discharge valve comprising a casing having an inner portion rigidly joined by a screw connection to said discharge fitting and forming therewith a discharge passage extending from said inner receptacle through an opening in said outer jacket, and a turn plug arranged cross wise of said discharge passage outwardly beyond but close to said jacket, said valve casing having exteriorly thereof a shoulder surrounding said discharge passage closely adjacent said turn plug, and a packing surrounding said inner portion of the valve casing and clamped between said shoulder and said jacket for closing said opening in the jacket through which said discharge passage extends.

HARVEY FELDMEIER.
CHARLES B. DALZELL.